US009807809B2

(12) United States Patent
Van Phan et al.

(10) Patent No.: US 9,807,809 B2
(45) Date of Patent: Oct. 31, 2017

(54) PERMITTING DIRECT MODE COMMUNICTIONS FOR PUBLIC SAFETY ONLY IN CERTAIN GEOGRAPHICAL AREAS

(75) Inventors: Vinh Van Phan, Oulu (FI); Ling Yu, Oulu (FI); Kari Veikko Horneman, Oulu (FI); Johanna Katariina Pekonen, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 14/375,881

(22) PCT Filed: Jan. 31, 2012

(86) PCT No.: PCT/EP2012/051533
§ 371 (c)(1),
(2), (4) Date: Dec. 3, 2014

(87) PCT Pub. No.: WO2013/113371
PCT Pub. Date: Aug. 8, 2013

(65) Prior Publication Data
US 2015/0173115 A1 Jun. 18, 2015

(51) Int. Cl.
*H04W 4/22* (2009.01)
*H04W 76/02* (2009.01)
(Continued)

(52) U.S. Cl.
CPC ........ *H04W 76/023* (2013.01); *H04W 4/001* (2013.01); *H04W 4/021* (2013.01);
(Continued)

(58) Field of Classification Search
CPC ............................ H04W 76/007; H04W 4/22
See application file for complete search history.

(56) References Cited

U.S. PATENT DOCUMENTS

| 7,398,097 B2 * | 7/2008 | Parkulo | G08B 25/016 340/501 |
| 8,483,652 B2 * | 7/2013 | Hall | H04W 4/02 455/404.1 |

(Continued)

FOREIGN PATENT DOCUMENTS

WO    WO 2007/128382 A1    11/2007

OTHER PUBLICATIONS

ETSI TS 100 396-10 V1.1.1 (Dec. 2000), "Terrestrial Trunked Radio (TETRA); Technical requirements for Direct Mode Operation (DMO); Part 10: Managed Direct Mode Operation (M-DMO)", 39 pgs.

(Continued)

*Primary Examiner* — Vladimir Magloire
*Assistant Examiner* — Frank Donado
(74) *Attorney, Agent, or Firm* — Harrington & Smith

(57) ABSTRACT

One kind of communication is referred to as device-to-device D2D communication. Misuse is an issue for this type of communication. For example a public safety network may permit D2D communication to operate in an area following a natural or other incident where the controlling network entity loses coverage. However this permission to allow D2D communication without the controlling entity can lead to users of D2D apparatus such as public safety communications devices configured for use in a first region being able to perform D2D communications in a second region in licensed bands that are illegal or not permitted. Furthermore, each device should be configured to setup an ad hoc network using D2D only in those areas where the licensed bands can be used legally by the device. Therefore, each device determines its position and blocks D2D operation when outside of a geographical area to which it was configured.

12 Claims, 7 Drawing Sheets

(51) Int. Cl.
*H04W 64/00* (2009.01)
*H04W 4/00* (2009.01)
*H04W 4/02* (2009.01)
*H04W 72/04* (2009.01)
*H04W 76/00* (2009.01)
*H04W 84/20* (2009.01)
*H04W 88/06* (2009.01)

(52) U.S. Cl.
CPC ............ *H04W 4/22* (2013.01); *H04W 64/00* (2013.01); *H04W 72/048* (2013.01); *H04W 76/007* (2013.01); *H04W 84/20* (2013.01); *H04W 88/06* (2013.01)

(56) References Cited

U.S. PATENT DOCUMENTS

| | | | | |
|---|---|---|---|---|
| 2007/0004378 A1* | 1/2007 | Muhonen | ................ | H04W 4/22 455/404.2 |
| 2008/0031203 A1* | 2/2008 | Bill | ........................ | H04L 51/04 370/338 |
| 2009/0075625 A1* | 3/2009 | Jackson | ................. | H04W 4/22 455/404.1 |
| 2010/0173586 A1* | 7/2010 | McHenry | ............ | H04L 27/0006 455/62 |
| 2010/0248680 A1* | 9/2010 | Agulnik | .............. | H04W 74/006 455/404.2 |
| 2010/0279647 A1* | 11/2010 | Jacobs | .................... | H04W 4/22 455/404.1 |
| 2011/0181408 A1* | 7/2011 | Greenis | ................. | G08B 27/00 340/539.1 |
| 2013/0045759 A1* | 2/2013 | Smith | ................... | H04W 64/00 455/456.6 |
| 2013/0170439 A1* | 7/2013 | Anderson | ......... | H04W 72/1215 370/329 |

OTHER PUBLICATIONS

3GPP TSG-SA1 Meeting #56, San Francisco, CA (US), Nov. 14-18, 2011, S1-113148, "Use cases for Proximity-based Services study", 4 pgs.
3GPP TR 22.8xx V0.1.0 (Nov. 2011), "3$^{rd}$ Generation Partnership Project; Technical specification Group SA; Feasibility Study for Proximity Services (ProSe) (Release 12)", 11 pgs.

* cited by examiner

Fig. 8

| REF LOCATION | REF RANGE |
|---|---|
| $X_1$  $Y_1$ | $R_1$ |
| $X_2$  $Y_2$ | $R_2$ |
| . . . | . . . |
| $X_N$  $Y_N$ | $R_N$ |

PERMITTING DIRECT MODE COMMUNICTIONS FOR PUBLIC SAFETY ONLY IN CERTAIN GEOGRAPHICAL AREAS

FIELD

The example and non-limiting embodiments of this invention relate generally to wireless communication systems, including methods, devices and computer programs for communicating in such systems, and more specifically relate to direct communications between mobile devices over public safety network allocated resources, also known as device-to-device D2D communications.

BACKGROUND

A communication system can be seen as a facility that enables communication sessions between two or more entities such as mobile communication devices and/or other stations associated with the communication system. A communication system and a compatible communication device typically operate in accordance with a given standard or specification which sets out what the various entities associated with the system are permitted to do and how that should be achieved. For example, the manner how the communication device can access the communication system and how communications shall be implemented between communicating devices, the elements of the communications network and/or other communication devices is typically defined.

In a wireless communication system at least a part of communications between at least two devices occurs over a wireless link. Examples of wireless systems include public land mobile networks (PLMN), satellite based communication systems and different wireless local networks, for example wireless local area networks (WLAN). In wireless systems an access node is provided by a base station. The radio coverage area of a base station is known as a cell, and therefore the wireless systems are often referred to as cellular systems. They can also be called mobile communication systems or mobile communication networks.

A mobile telecommunication network typically operates in accordance with a wireless standard. Examples include GSM (Global System for Mobile) EDGE (Enhanced Data for GSM Evolution) Radio Access Networks (GERAN), Universal Terrestrial Radio Access Networks (UTRAN), and evolved Universal Terrestrial Radio Access Networks (EUTRAN).

A further example of wireless communication systems is an architecture that is being standardized by the 3rd Generation Partnership Project (3GPP). This system is often referred to as the long-term evolution (LTE) of the Universal Mobile Telecommunications System (UMTS) radio-access technology. The aim of LTE is to achieve, inter alia, reduced latency, higher user data rates, improved system capacity and coverage, and reduced cost for the operator. A further development of the LTE is often referred to as LTE-Advanced.

In system according to the LTE standard a base station access node is called enhanced or evolved Node B (eNB).

A user can access the communication system by means of an appropriate communication device. A communication device of a user is often referred to as user equipment (UE) or terminal or mobile device or a mobile station. A communication device is provided with an appropriate signal receiving and transmitting arrangement for enabling communications with other parties. The device may also comprise user interface for communicating with the user and a controller for controlling the operation of the device.

A communication device may be arranged to communicate, for example, data for carrying communications such as voice, electronic mail (email), text message, multimedia, for enabling internet access, for carrying application specific data and so on. Users may thus be offered and provided numerous services via their communication devices. The communication connection can be provided by means of one or more data bearers.

In wireless systems a communication device provides a transceiver device that can communicate with another communication device such as e.g. an access node or a base station and/or another user equipment. The communication device may access a carrier provided by a base station and transmit and/or receive communications on the carrier.

A feature of wireless communication devices is that they offer mobility for the users thereof. A mobile communication device, or mobile device or mobile station for short, may also be transferred, or handed over, from a base station to another and even between base stations belonging to different systems.

A communication device or user equipment that has no continuous connection to its home system may nevertheless be considered as being a part of a communication system. In certain applications, for example in ad-hoc networks or in a public safety network (PSN), the communication system may be based on use of a plurality of user equipment capable of communicating with each other. D2D communications, alternatively termed mobile-to-mobile (M2M), machine-to-machine (M2M), terminal-to-terminal (T2T) or peer-to-peer (P2P) communications, therefore concerns wireless communications directly between UEs and is targeted for standardization sometime beyond 3GPP LTE Release 10 (also referred to as LTE-Advanced or LTE-A. In this kind of situation the devices performing D2D communications do not necessarily have a continuous connection to the own (PSN) network.

PSN networks are separate mobile communication networks that are used by law enforcement, rescue services, fire brigades and other public authorities or even public utilities for time and mission critical communication. In PSN networks the mobile devices may communicate directly with each other in Device to Device mode or in so called direct mode. The operation of PSN network must be fast, reliable and secure, regardless of lack of network coverage, lack of resources or any type of network failure. The PSN Network must have high availability, with no single point of failure, a highly resilient architecture and guaranteed availability even in times of a major incident, when the network will be stressed. It must also continue to operate through power outages.

The misuse of device to device (D2D) communications in a licensed communications band is an issue, especially when considering support of autonomous D2D in the absence of a controlling network. In such situations coverage may be required for some public safety use cases following the loss of a cellular or other controlling network entity. For example a public safety network (PSN) may permit device to device communication to operate in the area following a natural or other incident where the controlling network entity loses coverage. However this permission to allow device to device communication without the controlling entity can lead to users of D2D apparatus such as public safety (PS) communications devices configured for use in a first region being able to perform device to device (D2D) communications in a second region in licensed bands that are illegal or not permitted.

Furthermore in addition to PS D2D communication, commercial D2D communications could provide coverage in license bands outside of the reach of a cellular system by the implementation of an autonomous ad hoc network connecting back to the cellular base station. In such circumstances the apparatus should be configured to setup ad hoc network using D2D only in those areas where the license bands can be used legally by the apparatus.

SUMMARY

A target of the invention is to develop a method, a system and a mobile device so that the abovementioned drawbacks of the prior art are circumvented.

The target of the invention is achieved by a method, a system and a mobile device that is characterised by those features that are depicted in the independent patent claims.

According a first aspect there is provided a method comprising: determining at least one public safety network geographical information; and controlling at least one apparatus configured to operate in a device-to-device mode dependent on the public safety network geographical information.

The determining at least one public safety network geographical information may comprise at least one of: storing the at least one public safety network geographical information during the apparatus configuration; receiving the at least one public safety network geographical information during a registration of the apparatus on a communications network; and retrieving the at least one public safety network geographical information from an apparatus memory dependent on receiving an indicator for an at least one public safety network from a communications network server.

The at least one public safety network geographical information may comprise at least one of: at least one position and associated distance value; a communications network name; a communications network allocated spectrum; and a communications network identifier.

The method may further comprise: determining a location of the at least one apparatus; determining whether the at least one apparatus location is within the area defined by the at least one position and associated distance value; and wherein the controlling at least one apparatus comprises operating in a device-to-device mode dependent on the at least one apparatus location being within the area defined by the at least one position and associated distance value.

The area defined by the at least one position and associated distance value may comprise an allowed zone, and the controlling at least one apparatus may comprise enabling the at least one apparatus to operate in a device-to-device mode when the at least one apparatus location is within the area defined by the at least one position and associated distance value.

The area defined by the at least one position and associated distance value may comprise an excluded zone, and the controlling at least one apparatus may comprise disabling the at least one apparatus to operate in a device-to-device mode when the at least one apparatus location is within the area defined by the at least one position and associated distance value.

The determining whether the at least one apparatus location is within the area defined by the at least one position and associated distance value may comprise: determining a difference value between the at least one apparatus location and the at least one position; and determining whether the difference value is less than the at least one position associated distance value.

According to a second aspect there is provided a method comprising: transmitting information associated with at least one public safety network geographical information to an apparatus configured to control device-to-device operations dependent on the public safety network geographical information.

The transmitting information associated with at least one public safety network geographical information to an apparatus configured to control device-to-device operations dependent on the public safety network geographical information may comprise at least one of: transmitting at the least one public safety network geographical information to the apparatus; transmitting an indicator representing the at least one public safety network geographical information to the apparatus; transmitting a public safety network name to the apparatus; and transmitting a public safety network operational frequency band to the apparatus.

The method may comprise receiving a registration request from the apparatus prior to transmitting the information associated with the at least one public safety network geographical information.

According to a third aspect there is provided apparatus comprising at least one processor and at least one memory including computer code for one or more programs, the at least one memory and the computer code configured to with the at least one processor cause the apparatus to at least perform: determining at least one public safety network geographical information; and controlling the at least one apparatus configured to operate in a device-to-device mode dependent on the public safety network geographical information.

The determining at least one public safety network geographical information may cause the apparatus to perform at least one of: storing the at least one public safety network geographical information during the apparatus configuration; receiving the at least one public safety network geographical information during a registration of the apparatus on a communications network; and retrieving the at least one public safety network geographical information from an apparatus memory dependent on receiving an indicator for an at least one public safety network from a communications network server.

The at least one public safety network geographical information may comprise at least one of: at least one position and associated distance value; a communications network name; a communications network allocated spectrum; and a communications network identifier.

The apparatus may be further caused to perform: determining a location of the apparatus; determining whether the apparatus location is within the area defined by the at least one position and associated distance value; and wherein controlling the apparatus may comprise operating the apparatus in a device-to-device mode dependent on the apparatus location being within the area defined by the at least one position and associated distance value.

The area defined by the at least one position and associated distance value may comprise an allowed zone, and the controlling the apparatus may cause the apparatus to perform enabling the apparatus to operate in a device-to-device mode when the apparatus location is within the area defined by the at least one position and associated distance value.

The area defined by the at least one position and associated distance value may comprise an excluded zone, and controlling the apparatus may cause the apparatus to perform disabling the apparatus to operate in a device-to-device mode when the apparatus location is within the area defined by the at least one position and associated distance value.

The determining whether the apparatus location is within the area defined by the at least one position and associated distance value may cause the apparatus to perform: determining a difference value between the apparatus location and the at least one position; and determining whether the difference value is less than the at least one position associated distance value.

According to fourth aspect there is provided an apparatus comprising at least one processor and at least one memory including computer code for one or more programs, the at least one memory and the computer code configured to with the at least one processor cause the apparatus to at least perform: transmitting information associated with at least one public safety network geographical information to a further apparatus configured to control device-to-device operations dependent on the public safety network geographical information.

The transmitting information associated with at least one public safety network geographical information to the further apparatus configured to control device-to-device operations dependent on the public safety network geographical information may cause the apparatus to perform at least one of: transmitting the at least one public safety network geographical information to the further apparatus; transmitting an indicator representing the at least one public safety network geographical information to the further apparatus; transmitting a public safety network name to the further apparatus; and transmitting a public safety network operational frequency bands to the further apparatus.

The apparatus may be caused to perform receiving a registration request from the further apparatus prior to transmitting the information associated with at least one public safety network geographical information.

According to fifth aspect there is provided apparatus comprising: a network determiner configured to determine at least one public safety network geographical information; and a controller configured to control the apparatus configured to operate in a device-to-device mode dependent on the public safety network geographical information.

The network determiner may comprise at least one of: a memory configured to store the at least one public safety network geographical information during the apparatus configuration; a receiver configured to receive the at least one public safety network geographical information during a registration of the apparatus on a communications network; and an information determiner configured to retrieve the at least one public safety network geographical information from an apparatus memory dependent on receiving an indicator for an at least one public safety network from a communications network server.

The at least one public safety network geographical information may comprise at least one of: at least one position and associated distance value; a communications network name; a communications network allocated spectrum; and a communications network identifier.

The apparatus may further comprise: a location determiner configured to determine a location of the apparatus; a distance evaluator configured to determine whether the apparatus location is within the area defined by the at least one position and associated distance value; and wherein the controller is configured to control the apparatus to operate in a device-to-device mode dependent on the apparatus location being within the area defined by the at least one position and associated distance value.

The area defined by the at least one position and associated distance value may comprise an allowed zone, and the controller may be configured to enable the apparatus to operate in a device-to-device mode when the apparatus location is within the area defined by the at least one position and associated distance value.

The area defined by the at least one position and associated distance value may comprise an excluded zone, and the controller may be configured to disable the apparatus to operate in a device-to-device mode when the apparatus location is within the area defined by the at least one position and associated distance value.

The apparatus may comprise: a distance determiner configured to determine a difference value between the at least one apparatus location and the at least one position; further configured to determine whether the difference value is less than the at least one position associated distance value.

According to a sixth aspect there is provided an apparatus comprising: a transmitter configured to transmit information associated with at least one public safety network geographical information to a further apparatus configured to control device-to-device operations dependent on the public safety network geographical information.

The transmitter may comprise at least one of: a transmitter configured to transmit the at least one public safety network geographical information to the further apparatus; a transmitter configured to transmit an indicator representing the at least one public safety network geographical information to the further apparatus; a transmitter configured to transmit a public safety network name to the further apparatus; and a transmitter configured to a public safety network operational frequency bands to the further apparatus.

The apparatus may further comprise a receiver configured to receive a registration request from the further apparatus prior to transmitting the information associated with at least one public safety network geographical information.

According to a seventh aspect there is provided an apparatus comprising: means for determining at least one public safety network geographical information; and means for controlling the apparatus configured to operate in a device-to-device mode dependent on the public safety network geographical information.

The means for determining at least one public safety network geographical information may comprise at least one of: means for storing the at least one public safety network geographical information during the apparatus configuration; means for receiving the at least one public safety network geographical information during a registration of the apparatus on a communications network; and means for retrieving the at least one public safety network geographical information from an apparatus memory dependent on receiving an indicator for an at least one public safety network from a communications network server.

The at least one public safety network geographical information may comprise at least one of: at least one position and associated distance value; a communications network name; a communications network allocated spectrum; and a communications network identifier.

The apparatus may further comprise: means for determining a location of the apparatus; means for determining whether the apparatus location is within the area defined by the at least one position and associated distance value; and wherein the means for controlling the apparatus may be configured to operate the apparatus in a device-to-device mode dependent on the apparatus location being within the area defined by the at least one position and associated distance value.

The area defined by the at least one position and associated distance value may comprise an allowed zone, and the means for controlling the apparatus may be configured to enable the apparatus to operate in a device-to-device mode when the apparatus location is within the area defined by the at least one position and associated distance value.

The area defined by the at least one position and associated distance value may comprise an excluded zone, and the means for controlling the apparatus may be configured to disable the apparatus to operate in a device-to-device mode when the apparatus location is within the area defined by the at least one position and associated distance value.

The apparatus may comprise means for determining a difference value between the at least one apparatus location and the at least one position; and the means for determining whether the apparatus location is within the area defined by the at least one position and associated distance value may be configured to determine whether the difference value is less than the at least one position associated distance value.

According to an eighth aspect there is provided an apparatus comprising: means for transmitting information associated with at least one public safety network geographical information to a further apparatus configured to control device-to-device operations dependent on the public safety network geographical information.

The means for transmitting information may comprise at least one of: means for transmitting the at least one public safety network geographical information to the further apparatus; means for transmitting an indicator representing the at least one public safety network geographical information to the further apparatus; means for transmitting a public safety network name to the further apparatus; and means for transmitting a public safety network operational frequency bands to the further apparatus.

The apparatus may comprise means for receiving a registration request from the further apparatus; and the means for transmitting the information may be configured to transmit the information following the means for receiving the registration request.

A computer program product stored on a medium for causing an apparatus to perform the method as described herein.

An electronic device comprising apparatus as described herein.

A chipset comprising apparatus as described herein.

BRIEF DESCRIPTION OF DRAWINGS

Embodiments of the present invention are described below, by way of example only, with reference to the accompanying drawings, which are included to provide a further understanding of the invention and constitute a part of this specification. The drawings illustrate exemplary embodiments of the invention and together with the description help to explain the principles of the invention. In the drawings:

FIG. 8 shows an example geographical boundary information data table.

DETAILED DESCRIPTION OF SOME EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may also contain also features/structures that have not been specifically mentioned.

Reference will now be made in detail to the embodiments of the present invention, examples of which are illustrated in the accompanying drawings.

Before explaining in detail the certain exemplifying embodiments, certain general principles of a wireless communication system and wireless communication devices suitable for both cellular and D2D communication are briefly explained with reference to FIGS. 1 and 2 to assist in understanding the technology underlying the described examples.

Figure 1:
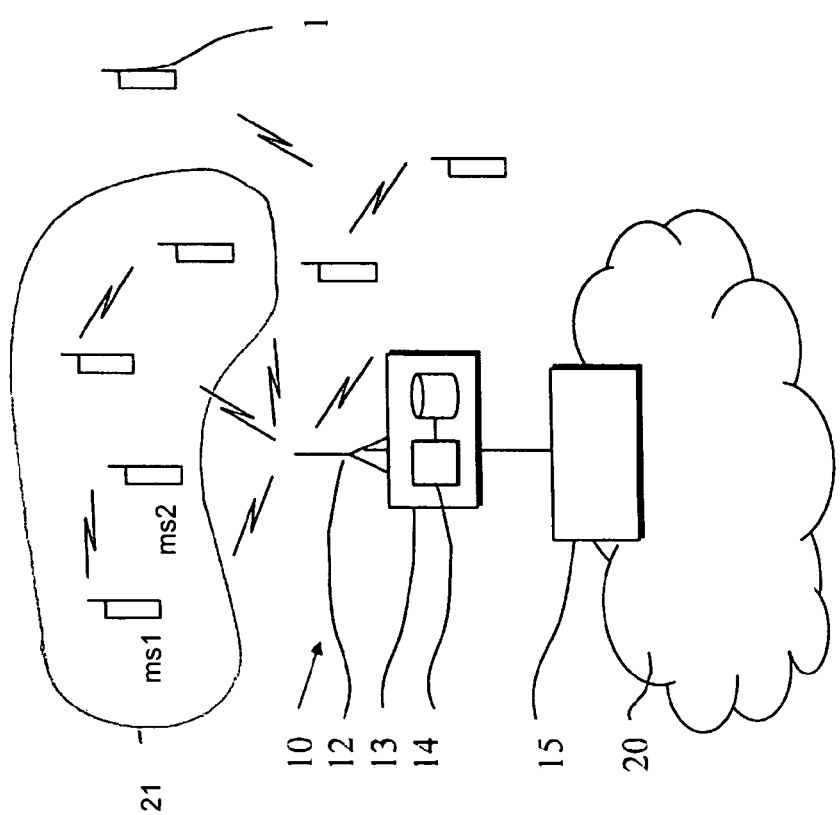
FIG. 1 shows a schematic view of a general exemplary situation in which some embodiments can be realised.

The mobile communication system shown here in FIG. 1 is a combination of at least two mobile communication networks namely the public safety network PSN 21 and a mobile communication network CN 10. The mobile communication system comprises at least a first MS1 and a second MS2 mobile communications apparatus 1 adapted to operate in a public safety network PSN 21. The mobile communication network as shown has a base station PBS or eNodeB 12. So, the mobile devices MS1 and MS2 belong originally to the public safety network PSN 21 and are designed to operate in the PSN network. The base station or eNodeB network element 12 maintains with its radio unit a first coverage area in which the mobile devices MS1 and MS2 are able to contact the public safety network PSN 21 and via it also other networks and network elements. The public safety network PSN 21 is a separate mobile communication network that only emergency services, police and rescue services e.g. fire department may use and connect to. It may also be designated only for the users belonging to law enforcement organizations. This PSN network 21 should be more reliable than normal public broadband mobile communication system 10 and mainly separated from any other, particularly commercial, networks so as to avoid any disruptions or malfunctions or other severe and bad network conditions to spread from any commercial network to the PSN network.

Mobile communications apparatus 1 can typically access wirelessly a mobile network system via at least one base station 12 or similar wireless transmitter and/or receiver node of the access system. A base station site typically provides one or more cells of a cellular system. In the FIG.

1 example the base station 12 is configured to provide a cell, but could provide, for example, three sectors, each sector providing a cell. Each mobile communications apparatus 1 and base station 12 may have one or more radio channels open at the same time and may communicate with more than one other station. In addition to communications with the base station, the communications apparatus can be in direct communication with the other communication apparatus.

A base station is typically controlled by at least one appropriate control apparatus so as to enable operation thereof and management of mobile communication devices in communication with the base station. A control entity of a base station can be interconnected with other control entities. In FIG. 1 the control apparatus is shown to be provided by block 13. An appropriate controller apparatus may comprise at least one memory, at least one data processing unit and an input/output interface. The controller is thus typically provided with memory capacity and at least one data processor 14. It shall be understood that the control functions may be distributed between a plurality of controller units and/or that a part of the control may be provided by a control apparatus controlling a plurality of base stations. The controller apparatus for a base station may be configured to execute an appropriate software code to provide the control functions as explained below in more detail.

In the FIG. 1 example the base station node 12 of the access is connected to a wider communication network 20 via node 15. A communication system may be provided by one or more interconnect networks and the elements thereof, and one or more gateway nodes may be provided for interconnecting various networks.

The communications apparatus 1 can be provided with wireless access to the communication system based on various access techniques, such as code division multiple access (CDMA), wideband CDMA (WCDMA), time division multiple access (TDMA), frequency division multiple access (FDMA), Orthogonal Frequency-Division Multiple Access (OFDMA), space division multiple access (SDMA), and so on.

A non-limiting example of mobile architectures where the herein described principles may be applied is known as the Evolved Universal Terrestrial Radio Access Network (E-UTRAN). Non-limiting examples of appropriate access nodes are a base station of a cellular system, for example a base station known as NodeB or enhanced NodeB (eNB) in the vocabulary of the 3GPP specifications. The eNBs may provide E-UTRAN features such as user plane Radio Link Control/Medium Access Control/Physical layer protocol (RLC/MAC/PHY) and control plane Radio Resource Control (RRC) protocol terminations towards mobile communication devices. Other examples include base stations of systems that are based on technologies such as wireless local area network (WLAN) and/or WiMax (Worldwide Interoperability for Microwave Access).

In FIG. 1 the broadband mobile communication network CN 10 comprises a second coverage area maintained by the base station 12 or in some embodiments can be a separate eNodeB network element according to the LTE standard.

Figure 2:
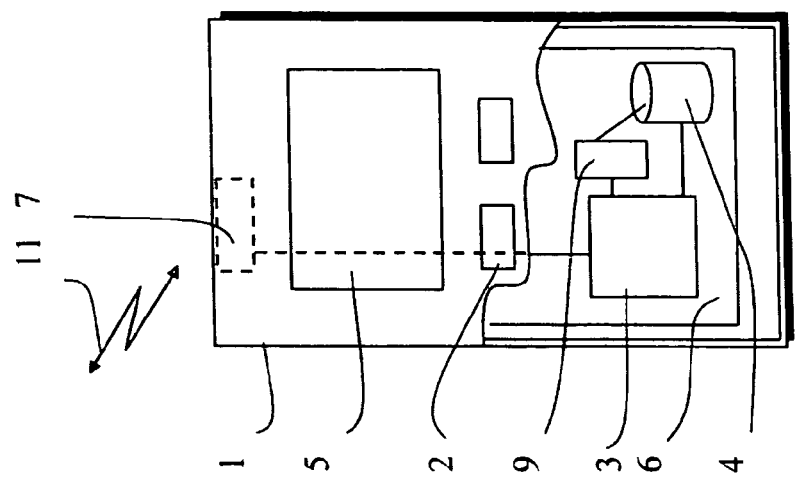
FIG. 2 shows a schematic view of a general D2D communications apparatus according to some embodiments.

FIG. 2 shows a schematic, partially sectioned view of a communications apparatus or communications device 1 that can be used for communication with the base station 12 and also for communication with other mobile devices in D2D communications using the PSN. An appropriate mobile communication device may be provided by any device capable of sending and receiving radio signals. Non-limiting examples include a mobile station (MS) such as a mobile phone or what is known as a 'smart phone', a portable computer provided with a wireless interface card or other wireless interface facility, personal data assistant (PDA) provided with wireless communication capabilities, or any combinations of these or the like. The mobile communications device 1 may be used for voice and video calls, for accessing service applications provided via a data network and so forth. The mobile communication device 1 may receive signals via appropriate apparatus for receiving and transmitting radio signals on wireless carriers, or radio bearers. In FIG. 2 a transceiver apparatus is designated schematically by block 7. The transceiver apparatus may be provided for example by means of a radio part and associated antenna arrangement. The antenna arrangement may be arranged internally or externally to the mobile device. A mobile device is also typically provided with at least one data processing entity 3, at least one memory 4 and other possible components 9 for use in tasks it is designed to perform. The data processing, storage and other entities can be provided on an appropriate circuit board and/or in chipsets. This feature is denoted by reference 6. The user may control the operation of the mobile device by means of a suitable user interface such as key pad 2, voice commands, touch sensitive screen or pad, combinations thereof or the like. A display 5, a speaker and a microphone are also typically provided. Furthermore, a mobile device may comprise appropriate connectors (either wired or wireless) to other devices and/or for connecting external accessories, for example hands-free equipment, thereto.

Direct mobile cellular device-to-device (D2D) communications, or D2D for short in the following, can also be provided between the mobile device 1 as shown in FIG. 2 in the system of FIG. 1. In direct mobile cellular device-to-device communications two or more of the devices can be paired into a set of paired communication devices where after a communications link between the members of the set can be established. It is noted that direct communications between devices can be referred to in various terms, for example as mobile-to-mobile (M2M), machine-to-machine (M2M), terminal-to-terminal (T2T) or peer-to-peer (P2P).

Mobile cellular device-to-device (D2D) communications can use licensed radio spectrum under supervision and control of at least one supporting system, typically a cellular system. D2D may use, at least for a part of the needed resources, the same radio resources of the supporting system or systems. Direct D2D communications can be incorporated into the cellular network for example to reduce transmitter power consumption in the participating communication devices and the network side, to improve spectrum efficiency, to increase cellular network capacity and coverage, and to create and support more services for users in an efficient fashion. Direct D2D communications in a cellular system may potentially achieve improved spectrum efficiency by spatial reuse. That is, certain radio resources may be simultaneously reused among different D2D users and/or D2D users and cellular users.

In the embodiments described herein the communications apparatus suitable for device to device D2D communications use device to device geographical boundary information (D2D_GBI) as configurable parameters for deriving preconditions permitting the initiation operations of autonomous D2D operations such as master device operations and slave device operations in licensed bands.

A cluster head, master device or apparatus of an autonomous D2D network is the device which starts advertising or broadcasting the availability of the apparatus within the licensed band. By broadcasting availability the apparatus is able to be 'discovered' by other devices performing a D2D discovery or scanning operation. The use of the D2D_GBI parameters as described herein, define a geographical region within which a D2D communications device is enabled to initiate a master D2D operation.

As described herein in some embodiments the geographical boundary information can be derived or preconfigured within the D2D devices themselves. In some other embodiments the geographical boundary information can be determined with assistance from a 'home' cellular network, or from a 'local' or visited cellular network. Furthermore as will be described herein the device to device geographical boundary information can be preconfigured in advance as part of a subscription profile or (re-)configured within the device upon re-registration or location update (which may include special cases where permission is granted for specific working areas such as fire brigades, police in emergency situations). In some embodiments of the geographical boundary information can be passed to the communications apparatus from local visited cellular network.

The device to device geographical boundary information (D2D_GBI) information can in some embodiments be provided or configured to be an indication of at least one defined and configurable reference point and associated with the at least one reference point a specified maximum allowed distance or range from which D2D operations are permitted for the devices. In other words the D2D_GBI defines a geographical region within which the device is permitted to operate over the country's or region's public safety network (PSN) and therefore geographical regions where the device cannot operate using the licensed radio bands.

Figure 3:
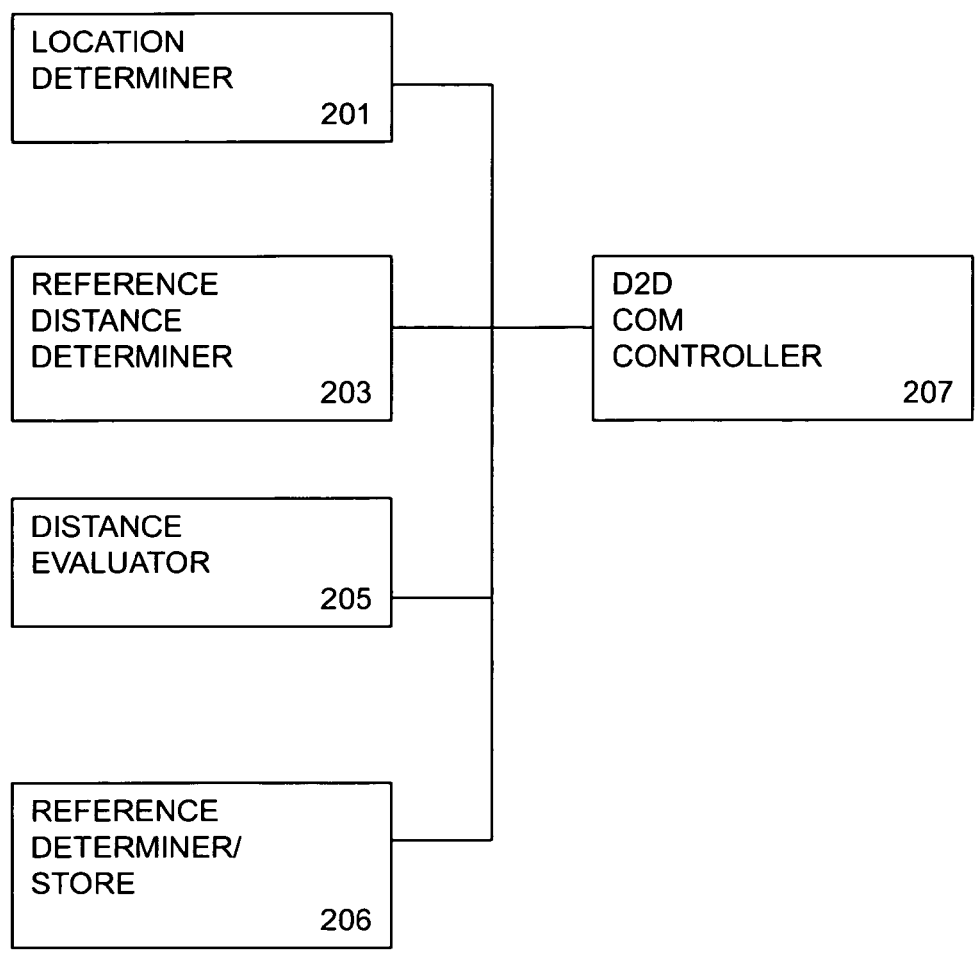
FIG. 3 shows a schematic view of a D2D communication apparatus in further detail with respect to some geographical boundary information implementation embodiments.

With respect to FIG. 3 an example device to device (D2D) communications apparatus or mobile device with respect to some embodiments is described in further detail.

In some embodiments the mobile device comprises a location determiner 201. The location determiner 201 can be configured to determine the location of the mobile device. The location determiner 201 can in some embodiments be implemented by a GPS or similar satellite-based position estimator or satellite-based location determining means.

The location determiner 201 therefore in some embodiments is configured to receive timing signals from orbiting satellites to determine the apparatus location.

In some embodiments the location determiner 201 can comprise any suitable signal based location estimator. For example the signal based location estimator can be configured to determine a device location estimate using cellular network signals. The location determining means can for example determine an estimate of the location of the mobile device relative to the location of any neighbouring cellular base station positions. Similarly the location determiner 201 can in some embodiments determine an estimate of the location of the mobile device by any suitable processing of known beacon signals.

In some embodiments the mobile device comprises a reference distance determiner 203. The reference distance determiner 203 can be configured to receive the mobile device location estimate from the location determiner 201. Furthermore the reference distance determiner 203 can be configured to receive the reference location information from the reference determiner/store 206. The reference distance determiner 203 can for example receive the at least one reference location values and the mobile device location estimate and be configured to determine the distance between the current location and the at least one reference locations. The reference distance determiner 203 can then in some embodiments pass the reference distance values to the distance evaluator 205.

In some embodiments the mobile device comprises a distance evaluator 205. The distance evaluator 205 or evaluation means is configured to receive the difference distances from the distance determiner and the associated reference location range values and determine whether the reference distance differences are within the associated ranges. Where at least one of the distances is within the associated reference range then a suitable indicator can be passed to the D2D communications controller 207.

The mobile device in some embodiments comprises a device to device (D2D) communications controller 207. The device to device communications controller 207 can be configured to control the initialisation of suitable device to device operations.

Figure 4:
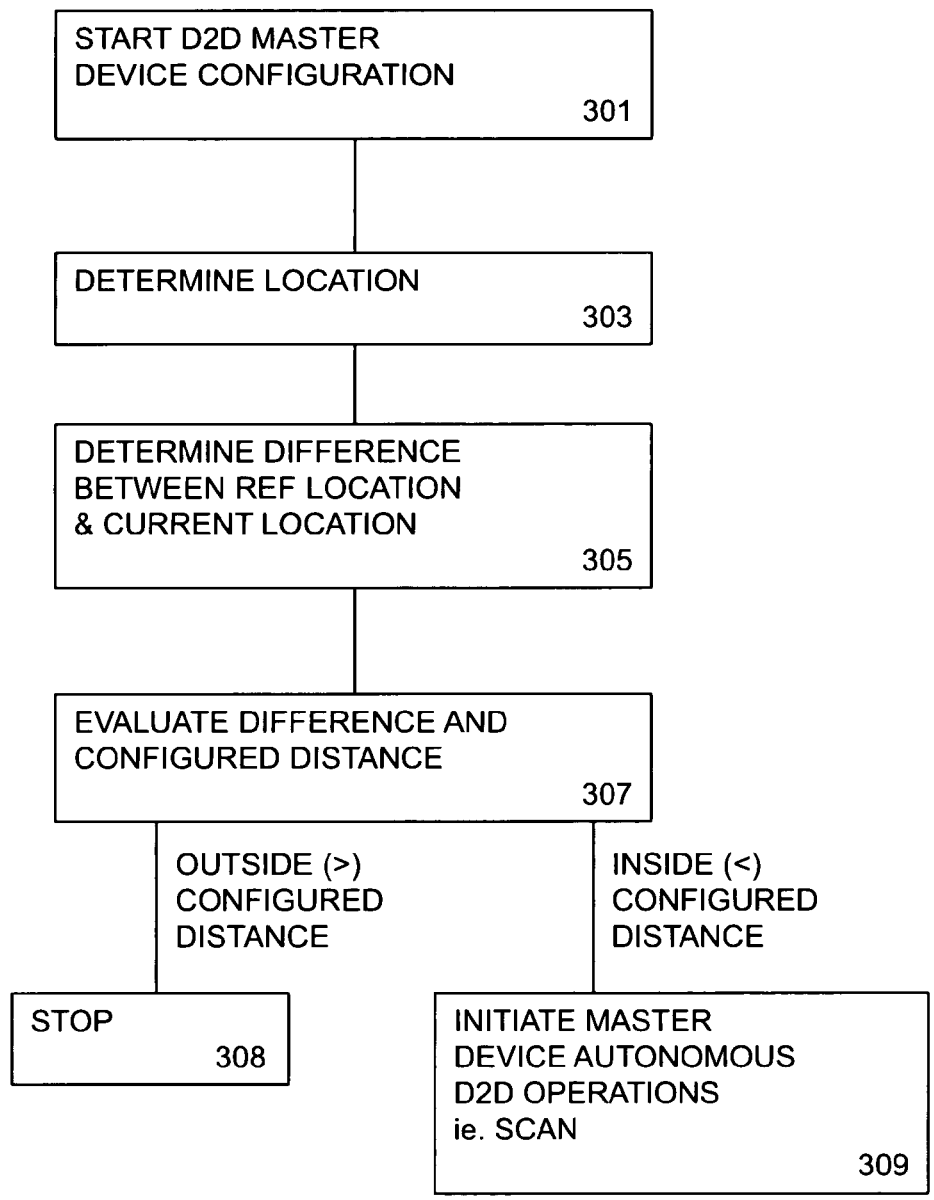
FIG. 4 is a flow diagram illustrating the functioning of a method of initialising a master D2D communications operation according to some embodiments.

For example with reference to FIG. 4 the operation of controlling the device to device master device configuration operation is shown. As discussed herein the master device operation is one where the mobile device is configured to broadcast over the determined D2D band that the device is available for discovery.

The device to device communications controller 207 can for example receive from a higher level control (such as initialised using a user interface input requesting a D2D communications service to be started, or initialised automatically upon detecting that the device is out of coverage of PSN) an indicator or message requesting the start of a device to device master device configuration operation.

With respect to FIG. 4 the operation of starting the device to device master device configuration operation is shown in step 301.

The D2D communications controller 207 can be configured to initialise the location determiner 201 to determine a current location estimate for the mobile device.

The operation of determining the location of the mobile device is shown in FIG. 4 by step 303.

Furthermore the D2D communications controller 207 can be configured to control the reference distance determiner 203 to determine the difference between the at least one reference location and the current location of the mobile device.

The operation of determining the difference between the reference location and the current location is shown in FIG. 4 by step 305.

The D2D communications controller 207 can be further configured to control the distance evaluator 205 to evaluate the at least one difference distance and the associated at least one reference location range value to determine whether the difference is greater than the associated configured distance.

The operation of evaluating the difference distance and range value is shown in FIG. 4 by step 307.

The D2D communications controller 207 can, based on the output from the distance evaluator 205 determine whether or not to initiate the master device autonomous D2D operations.

Thus when the D2D communications controller 207 receives from the distance evaluator 205 an indicator that all of the difference value(s) are greater than the associated configured distance or range then the D2D communications controller stops the D2D master device configuration operation.

The operation of stopping the D2D master device configuration operation is shown in FIG. 4 by step 308.

Where at least one of the differences is inside the configured distance or range, the D2D communications controller 207 can be configured to initiate the master device autonomous D2D operations. In other words the D2D communications controller having determined that the mobile device or communications apparatus is within the allowed public safety network range permits the use of the transmitter to broadcast that the mobile device is suitable for D2D discovery.

Figure 5:
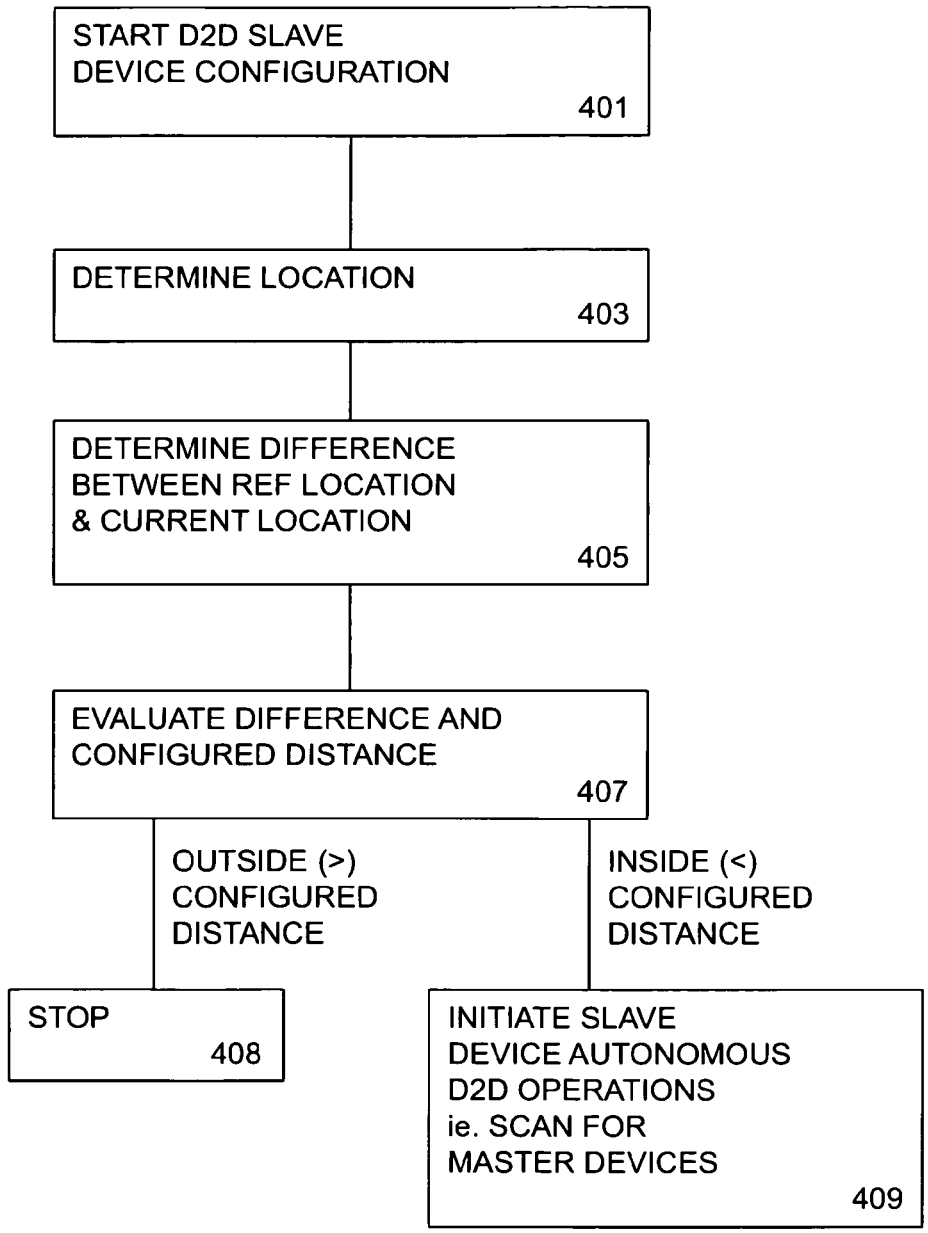
FIG. 5 is a flow diagram illustrating the functioning of a method of initialising a slave D2D communications operation according to some embodiments.

A similar operation is shown with respect to FIG. 5 where the D2D communication controller 207 is controlling the D2D slave device configuration operation.

In some embodiments the D2D communications controller 207 receives an indicator or request requesting the start of the D2D slave device configurations operation.

The operation of starting the D2D slave device configuration operation is shown in FIG. 5 by step 401.

The D2D communications controller 207 can then be configured to control the location determiner 201 to determine a current location or position for the mobile device.

The operation of determining the location of the mobile device is shown in FIG. 5 by step 403.

The D2D communications controller 207 can further be configured to control the reference distance determiner 203 to determine the difference between the reference location and current location (and in embodiments where there are more than one reference location value determining the difference between reference locations and the current location).

The operation of determining the difference between the reference location and current location is shown in FIG. 5 by step 405.

The D2D communications controller 207 can further be configured to control the distance evaluator 205. The distance evaluator 205 can be configured to evaluate the difference value (or values) determined by the reference distance determiner 203 and the configured distance or range value (or values). Therefore where in embodiments there is more than one reference location or range then the distance evaluator 205 can be configured to evaluate the difference between each reference location and the current location and the associated configured distance or range.

The operation of evaluating the difference and configured distance is shown in FIG. 5 by step 407.

The D2D communications controller 207 can then be configured to determine whether or not at least one difference value is within the configured distance or range value. Where no difference value is within the configured distance or range value (in other words the apparatus is operating outside of the public safety network as defined by the geographical boundary information) then the D2D communications controller 207 can be configured to stop the operation of slave device configuration.

The operation of stopping the slave device configuration operation is shown in FIG. 5 by step 408.

Where at least one of the differences is within the associated configured distance or range then the D2D communications controller can be configured to initiate the slave device autonomous D2D operations. In other words the slave device autonomous D2D operations can be started as the communications apparatus is within the public safety network as defined by the geographical boundary information.

The operation of initiating the slave device autonomous D2D operations is shown in FIG. 5 by step 409.

In some embodiments the feature for D2D slave devices can be enabled or disabled by the end user rather than the network. In such embodiments it may be possible to prevent unnecessary scanning operations for D2D discovery when outside of the defined public safety network region as defined by the geographical boundary information.

Figure 7:
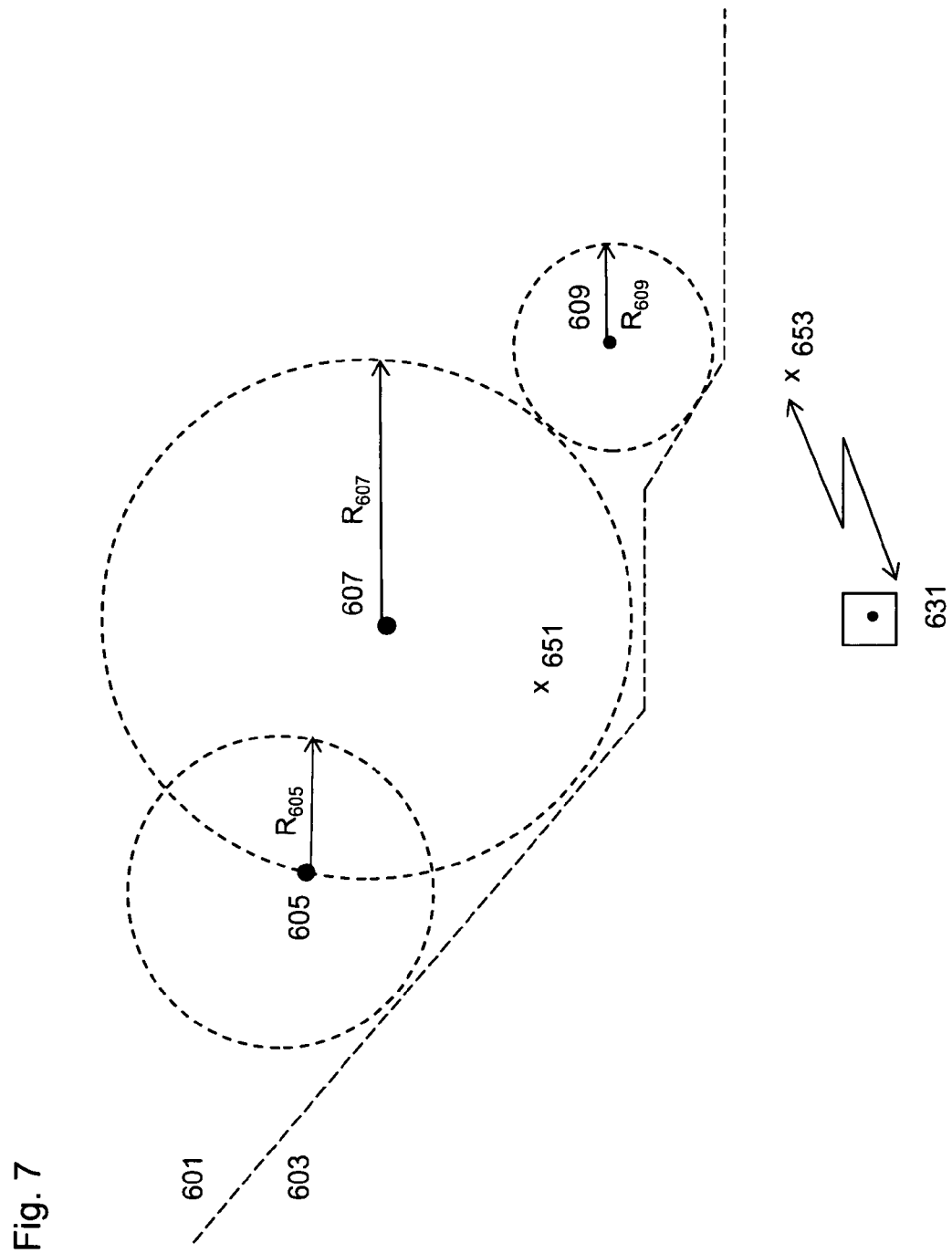
FIG. 7 shows example D2D communications apparatus implementing geographical boundary information.

With respect to FIG. 7 an example of the application of geographical boundary information in public safety networks is shown. FIG. 7 shows a geographical boundary, such as between two regions or countries where a first country 601 and a second country 603 are neighbouring countries, one of which is configured to permit D2D services to occur but the other only permitting cellular communications. FIG. 7 furthermore shows two device to device (D2D) public safety network (PSN) mobile devices 651 and 653.

With respect to the first country 601 permitting D2D services the geographical boundary information is shown in FIG. 7 in the form of reference positions—circles 605, 607 and 609, with associated reference distances or ranges—dashed lines. Thus the mobile device 651 within the range of a defined reference 607 would be permitted to initialise master or slave D2D operations according to embodiments described herein whereas mobile device 653 outside of the ranges defined by the geographical boundary information would not be permitted to have device to device communication on the licenced band of their home public safety network but would be able to communicate with the base station 631 of the cellular network.

In some embodiments the apparatus comprises a reference determiner/store 206. The reference determiner/store 206 is configured to determine and/or store the reference position and range information defining the geographical boundary information for device to device communication (D2D_GBI).

An example of a D2D geographical boundary information (D2D_GBI) data table is shown in FIG. 8. The D2D_GBI data table 700 shows a series of data entries. An example data entry 711 comprises a reference location 701 defined as a reference location $X_1, Y_1$ and a reference distance or range value 703 $R_1$. It would be understood that in some embodiments there can be more than one data entry such as shown in FIG. 8 where there are N entries defining N reference locations and N associated range values. In some embodiments the reference distance or range value is a singular value R associated with every reference location $(X_1\ Y_1)$ to $(X_N\ Y_N)$ however in some embodiments the associated reference distance or range value can differ $R_1$ to $R_N$ from reference location to location value $(X_1\ Y_1)$ to $(X_N\ Y_N)$.

Although the D2D_GBI data is shown in FIG. 8 as a data table, any other suitable format can be used. In some embodiments each entry further comprises a network identifier. The network identifier can indicate which geographical boundary information is allocated to which region or national public safety network (PSN). In such embodiments the mobile device can be configured to select a public safety network within which the mobile device is allowed to operate within and furthermore which data entries or GBI can be used to control the D2D operations. For example a first PSN (and associated D2D_GBI) can be defined as being allocated to a first region or country, and a second PSN (and associated D2D_GBI) can be defined as being allocated to a second region or country.

Therefore in some embodiments a mobile device allocated to a service (for example a first region fire service or police service) can be configured to operate according to the first PSN D2D_GBI, a mobile device allocated to a second service (for example a second region fire service or police service) can be configured to operate according to the second PSN D2D_GBI, but when required both could be configured (for example when required to co-operate with each other) to operate in the others geographical region.

In some embodiments the reference determiner/store 206 can be preconfigured in advance as part of a subscription profile or can be reconfigured upon D2D reregistration or location updates to define the reference information.

Figure 6:
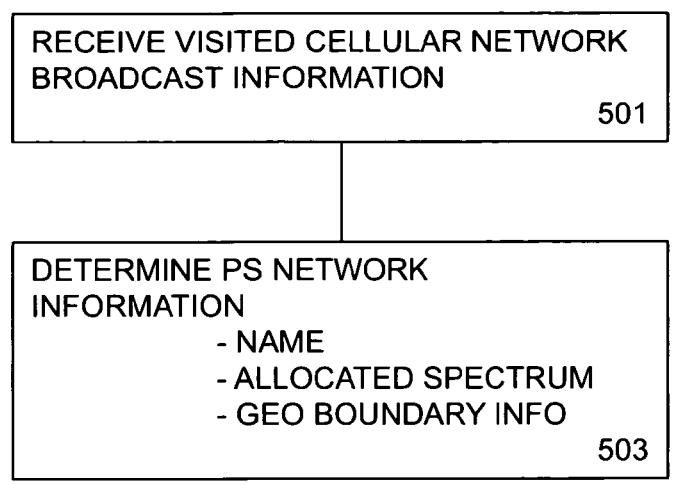
FIG. 6 is a flow diagram illustrating the functioning of a method of determining geographical boundary information for D2D communications according to some embodiments.

In some embodiments, as shown in FIG. 6, the reference determiner/store 206 can be configured to receive visited cellular network broadcast information. The broadcast information can in some embodiments contain information about the identity of the national or regional public service network where the apparatus is currently located.

The operation of receiving the visited cellular network broadcast information is shown in FIG. 6 by step 501.

Furthermore the reference determiner 206 can be configured to from such information determine public safety network information. For example the reference determiner can determine the name of the currently visited public safety network, the allocated spectrum information, or geographical boundary information defining the visited public safety network. The mobile device and reference determiner 206 can then find and read such information once being out of their home network coverage and determine whether they are allowed to initiate autonomous D2D communications on licensed bands of their home network or not.

In some embodiments the visited cellular network can further broadcast to suitable D2D devices information about the autonomous D2D communications licensed bands in order to guide as well as prevent misuse of D2D communications. For example where the setting up of public safety network it is to provide a temporary network for emergency services where the apparatus would normally not be allowed to operate then the visited cellular network can broadcast updates for the geographical boundary information to be stored within the reference store.

In the embodiments described herein the device to device geographical border information is defined in terms of 'allowed zones' within which the mobile device is permitted to operate. It would be understood that in some embodiments the device to device geographical border information is defined in terms of 'exclusion zones' within which the mobile device is forbidden to operate. In such embodiments where the distance is within the 'exclusion zone' the device-to-device operations are stopped and where it is determined that the device is outside all of the 'exclusion zones' then the mobile device is permitted to operate in device-to-device mode. In some embodiments a combination of 'allowed zones' and 'forbidden zones' may be defined.

In some embodiments where a position estimate is unable to be obtained, for example indoors when using satellite based estimation or positional estimator failure, then a fail-safe mode of operation can be defined. For example in some embodiments a null or no positional estimate is returned from the position estimator then the controller can automatically stop the mobile device from operating in a device-to-device mode.

Furthermore in the embodiments discussed herein the device to device geographical border information is defined in terms of 'allowed zones', however it would be understood that in some embodiments the geographical border information is defined in terms of network name. In such embodiments the mobile device is permitted to operate in a device-to-device mode of operation providing that the location it is operating within is a region geographically defined by a cellular or other communications network coverage. In other words in such embodiments the GBI table is defined by network names or identifiers, the location determiner estimates a location based on the cellular or other network identity and the D2D communications determiner enables or disables D2D communication dependent on whether the mobile device is within the range of the permitted network/ outside the range of the exclusion network. For example the GBI table could include an entry for mobile phone operator network Vodafone UK, and providing the mobile device is within range of a Vodafone UK network signal permit D2D operation for the device. In such an example when the device is relocated to Finland and fails to receive a Vodafone UK network signal the controller can stop D2D operations on the device.

Similarly it would be understood that in some embodiments the geographical border information is defined in terms of network operating frequencies or allocated spectrum. In such embodiments the mobile device is permitted to operate in a device-to-device mode of operation providing that the location it is operating within is a region geographically defined by a frequency band similar to that configured for the mobile device. In other words in such embodiments the GBI table is defined by network operating frequencies, the location determiner estimates a location based on the operating frequencies and the D2D communications determiner enables or disables D2D communication dependent on whether the mobile device is within the range of the permitted network/outside the range of the exclusion network. For example the GBI table could include an entry for frequency band X, and providing the mobile device is able to operate within frequency band X to permit D2D operation for the device. In such an example when the device is relocated to an area using frequency band Y the controller can stop D2D operations using band X on the device.

An appropriately adapted computer program code product or products may be used for implementing the embodiments, when loaded on an appropriate data processing apparatus, for example for determining geographical boundary based operations and/or other control operations. The program code product for providing the operation may be stored on, provided and embodied by means of an appropriate carrier medium. An appropriate computer program can be embodied on a computer readable record medium. A possibility is to download the program code product via a data network. In general, the various embodiments may be implemented in hardware or special purpose circuits, software, logic or any combination thereof. Embodiments of the inventions may thus be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

It is noted that whilst embodiments have been described in relation to LTE-Advanced, similar principles can be applied to any other communication system where direct communications between communication devices can occur. For example, this may be the case in applications where no fixed control equipment is provided but a communication system is provided by means of a plurality of mobile user equipment, for example in adhoc networks, and at least one of the user equipments can provide control on the communications based on grouping that takes interference into account. Therefore, although certain embodiments were described above by way of example with reference to certain exemplifying architectures for wireless networks, technologies and standards, embodiments may be applied to any other suitable forms of communication systems than those illustrated and described herein.

It is also noted herein that while the above describes exemplifying embodiments of the invention, there are several variations and modifications which may be made to the disclosed solution without departing from the scope of the present invention.

The invention claimed is:

1. A method comprising:
   determining at least one public safety network geographical information comprising a geographical area defined by at least one position and associated distance value, the geographical area corresponding to at least one of: an allowed zone and an excluded zone;
   determining a location of an apparatus;
   determining whether the apparatus location is within the geographical area defined by the at least one position and associated distance value; and
   in response to determining that the apparatus is within the geographical area, controlling the apparatus by permitting the apparatus to operate in a device-to-device mode of operation dependent on at least one of: whether the geographical area corresponds to allowed zone, and whether the geographical area corresponds to an excluded zone,
   wherein, for the case the geographical area defined by the at least one position and associated distance value comprises an excluded zone, controlling the apparatus comprises disabling the apparatus to operate in a device-to-device mode when the apparatus location is within the excluded zone,
   wherein determining the at least one public safety network geographical information comprises storing the at least one public safety network geographical information during an apparatus configuration and retrieving the at least one public safety network geographical information from the memory of the apparatus.

2. The method as claimed in claim 1, wherein retrieving the at least one public safety network geographical information from the memory of the apparatus memory is dependent on receiving an indicator for at least one public safety network from a communications network server.

3. The method as claimed in claim 2, wherein the at least one public safety network geographical information further comprises at least one of:
   a communications network name;
   a communications network allocated spectrum; and
   a communications network identifier.

4. The method as claimed in claim 1, wherein, for the case the geographical area defined by the at least one position and associated distance value corresponds to an allowed zone, controlling the apparatus comprises enabling the apparatus to operate in a device-to-device mode when the apparatus location is within the allowed zone.

5. The method as claimed in claim 1, wherein determining whether the apparatus location is within the geographical area defined by the at least one position and associated distance value comprises:
   determining a difference value between the apparatus location and the at least one position; and
   determining whether the difference value is less than the at least one position associated distance value.

6. An apparatus comprising at least one processor and at least one memory including computer code for one or more programs, the at least one memory and the computer code configured to with the at least one processor cause the apparatus to at least:
   determine at least one public safety network geographical information comprising a geographical area defined by at least one position and associated distance value, the geographical area corresponding to at least one of: an allowed zone and an excluded zone;
   determine a location of the apparatus;
   determine whether the apparatus location is within the geographical area defined by the at least one position and associated distance value; and
   in response to the determination that the apparatus is within the geographical area, control the apparatus by permitting the apparatus to operate in a device-to-device mode of operation dependent on at least one of: whether the geographical area corresponds to allowed zone, and whether the geographical area corresponds to an excluded zone, wherein, for the case the geographical area defined by the at least one position and associated distance value corresponds to an excluded zone, controlling the apparatus causes the apparatus to disable the apparatus to operate in a device-to-device mode when the apparatus location is within the excluded zone,
   wherein the at least one public safety network geographical information is stored during an apparatus configuration and retrieving the at least one public safety network geographical information from the memory of the apparatus.

7. The apparatus as claimed in claim 6, wherein, for the case the geographical area defined by the at least one position and associated distance value corresponds to an allowed zone, controlling the apparatus causes the apparatus to:
   enable the apparatus to operate in a device-to-device mode when the apparatus location is within the allowed zone.

8. The apparatus as claimed in claim 6, wherein the at least one public safety network geographical information further comprises at least one of:
   a communications network name;
   a communications network allocated spectrum; and
   a communications network identifier.

9. A computer program product stored on a non-transitory computer readable medium for causing an apparatus to perform the method of claim 1.

10. A method comprising:
    determining at least one public safety network geographical information comprising a geographical area defined by at least one position and associated distance value, the geographical area corresponding to at least one of: an allowed zone and an excluded zone;
    determining a location of an apparatus;
    determining whether the apparatus location is within the geographical area defined by the at least one position and associated distance value; and
    in response to determining that the apparatus is within the geographical area, controlling at least one apparatus by permitting the at least one apparatus to operate in a device-to-device mode of operation dependent on at least one of: whether the geographical area corresponds to allowed zone, and whether the geographical area corresponds to an excluded zone,
    wherein, for the case the geographical area defined by the at least one position and associated distance value comprises an excluded zone, controlling the apparatus comprises disabling the apparatus to operate in a device-to-device mode when the apparatus location is within the excluded zone,
    wherein the determining at least one public safety network geographical information comprises receiving the at least one public safety network geographical information during a registration of the apparatus on a communications network.

11. The method of claim 10, wherein, for the case the geographical area defined by the at least one position and associated distance value corresponds to an allowed zone, enabling the apparatus to operate in a device-to-device mode when the apparatus location is within the allowed zone.

12. The method of claim 10, wherein the at least one public safety network geographical information further comprises at least one of:
   a communications network name;
   a communications network allocated spectrum; and
   a communications network identifier.

* * * * *